Oct. 1, 1929.  B. JONES  1,730,078
DRIFT SIGHT
Filed Sept. 20, 1924
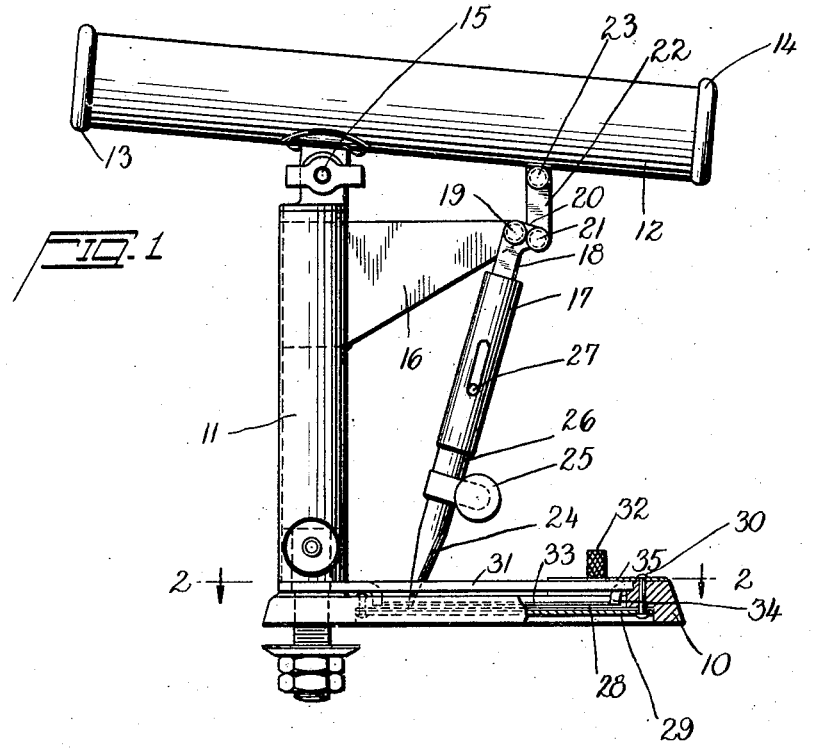
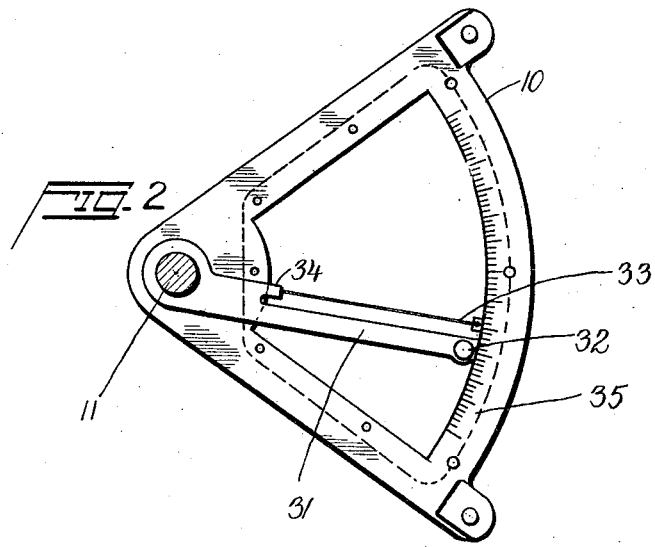
INVENTOR
*Bradley Jones*
BY
 ATTORNEY Patented Oct. 1, 1929

1,730,078

UNITED STATES PATENT OFFICE

BRADLEY JONES, OF WINTHROP, MASSACHUSETTS

DRIFT SIGHT

Application filed September 20, 1924. Serial No. 738,945.

This invention relates to a telescopic drift indicator or drift sight for aircraft.

The principal object of the invention is to provide a drift sight adapted to be directed rearwardly from an airplane or other aircraft and maintained on a patch of smoke or some other stationary object on the earth's surface used as a reference, and adjusted periodically as the craft drifts, the extent of adjustment of the sight being measured in degrees of drift.

Another object relating to the construction of an instrument of this character to be used for the purpose described, is to provide a telescopic sight mounted for universal movement on a vertical standard, to be shifted laterally more and more as the plane drifts, and adjusted more and more closely to a horizontal, as the plane moves away from the stationary reference, the adjustment of the telescope operating a pencil or other scribing instrument to trace an irregular line, the deviation of which, from a straight line in the same general direction, occurring between the instantaneous bearing at the time the stationary reference is first picked up by the telescope, and the final bearing when the reference goes out of sight, determining the extent of drift.

A still further object of the invention, ancillary to the last mentioned object, is to provide a radial hair line to be placed over an irregular radial line described by the pencil in the adjustment of the telescope, for determining the general average deviation or drift in terms of degrees, measured on a scale with relation to which the hair line is adjusted.

In the following detailed description reference is made to the accompanying drawing illustrating the invention, in which Fig. 1 is a side view, partly in section, of a drift sight made in accordance with the invention.

Fig. 2 is a horizontal cross section taken on the line 2—2 of Fig. 1, looking in the direction indicated by the arrows.

The instrument of the present invention is designed for use on aircraft generally for determining the extent to which the craft drifts from its course, in order that the pilot may know to what extent to head into the cross wind causing the drift, to maintain a certain desired course. It is intended that calculations of drift be made at stated intervals where the craft is proceeding on a long flight, with a view to making proper compensation for drift from time to time so the craft will ultimately arrive at a certain desired destination on a predetermined line of flight.

The instrument comprises a frame-like base 10 which may be secured suitably to a convenient point on the fuselage at the cockpit, substantially on the fore and aft axis of the ship, where it can be sighted rearwardly over or past the tail surface by the pilot or an observer. A vertical standard 11 on the base 10 supports a telescope sight 12. The latter has a peep-hole eye-piece 13 at the forward end and a lens held in the rear end by a ring 14, in which if desired a cross hair or other center-line device may be provided in order to facilitate accurate adjustment of the sight onto a patch of smoke or other stationary object on the earth's surface used as a reference. The sight 12 is pivoted at 15 to the top of the standard 11 for adjustment on a horizontal axis. The standard 11 itself is pivotally mounted on the base 10 to rotate on a vertical axis, so that universal movement of the sight 12 is permitted. A bracket 16 extends from the standard 11 beneath the sight 12 in the same vertical plane therewith, and moves with the sight and standard in the lateral adjustment thereof. A tube 17 has a bell crank member 18 fixed to the upper end thereof, pivoted at 19 to the outer end of the bracket 16. The arm 20 of the bell crank 18 is pivoted as at 21, to a link 22 pivoted at 23 to the under side of the sight 12. Thus in the adjustment of the sight 12 up and down in a vertical plane on its pivot 15, an oscillating movement is communicated to the tube 17 through the link 22 and bell crank 18. In this movement of the tube 17 a pencil 24 is caused to describe a radial line relative to the standard 11. The pencil 24 is clamped by means of a set screw 25 in a holder reciprocable in the tube 17, but prevented from movement out of the tube by a pin 27 operating in an elongated slot in the wall of the tube 17. The pin 27 serves also to prevent rotation of the pencil or scribe 24 which might tend to alter the character of the line made by the latter in its movement.

The pencil 24 rests upon a record 28, which may be a piece of paper but is preferably a piece of roughened celluloid which constitutes a permanent element of the instrument. The record 28 is supported on a plate 29 riveted as at 30 in the base 10. If desired, the plate 29 may be provided with regular radial lines visible through the celluloid record 28 to facilitate the matter of reading the degrees of drift indicated by the deviation of the irregular radial line described by the pencil 24. However I prefer to provide for this purpose an arm 31 pivoted to the standard 11 and adjustable by a knob 32 over the record 28. A hair line 33 is provided by a wire fixed to lugs 34 depending from the arm 31. The hair line 33 extends truly radially from the standard 11 and in the adjustment of the arm 31 has its outer end moving in relation to a scale 35 calibrated in degrees, for the measurement of drift. The pencil 24 at the time the reference is first picked up is at a point nearest the standard 11 and in the adjustment of the sight 12 more and more toward the horizontal, the pencil describes a radial line. If there is no change in the angle of drift, in which event the sight 12 is not shifted laterally, the line described would be truly radial. However, as the sight is adjusted more and more toward the horizontal, it is necessarily shifted laterally when the plane is changing its angle of drift in order that the sight may be maintained on the stationary reference on the earth's surface. Consequently the line is irregular and deviates more and more from a true radial line as the pencil moves outwardly. The hair line 33 may be placed over the line described by the pencil, taking into consideration the instantaneous bearing as denoted by the point at which the pencil first commences to describe the radial line, namely the point where the reference was first picked up with the telescope. Considering this point, and the point at which the pencil ultimately winds up when the sight is nearly horizontal, namely the point where the reference is lost sight of, a general average deviation may be arrived at and measured in terms of degrees on the scale 35.

The instrument is arranged to be sighted from time to time to determine the extent of drift so that the pilot may compensate therefor by heading into the cross wind causing the drift. A trail bomb is ordinarily dropped to provide a stationary patch of smoke on the earth's surface, which at the instantaneous bearing of the aircraft is approximately on a line with the fore and aft axis of the ship, and which can be observed by sighting rearwardly over or past the tail surface. However any other stationary visible object on the earth's surface may be used as a reference in this connection. The patch of smoke is constantly kept in view through the sight by shifting it laterally as the plane drifts and by adjusting it more and more closely to the horizontal as the distance from the patch of smoke increases in the flight of the plane. When the sight is nearly horizontal, or at a time when the patch of smoke can be no longer distinctly seen but forms part of the haze in the distance, the determination of degrees of drift is made by observing the irregular radial line described by the pencil in the adjustment of the sight. Knowing the drift, the pilot who is flying by compass can alter his course to compensate for the drift and thereby maintain a certain desired course and arrive at a desired destination, as corrections for drift are made from time to time.

While I have described the invention as applied to a specific embodiment, it is to be understood that the same is merely for the purpose of illustration and may be varied in detail without departing from the spirit and scope of the invention.

I claim:

1. In a drift sight for aircraft, a support, a sight, means mounting said sight on said support for pivotal movement about a vertical axis and pivotal movement about a horizontal axis, a record chart on said support, a scribe connected with said sight and disposed substantially at right angles thereto to move laterally with lateral movement of said sight and radially in the vertical pivotal movement of the sight whereby an irregular radial line may be inscribed on said chart as the sight is moved, and means movable on said support to be moved over said chart to be compared with the line made by said scribe on said chart whereby the drift angle of the craft may be determined.

2. In a drift sight for aircraft, the combination with a standard pivoted on a vertical axis, of a sight, means mounting said sight for pivotal movement on a horizontal axis on the standard, a record chart under said sight, a scribe pivoted on the standard below said sight and connected therewith to move laterally with lateral movement of the sight and radially with reference to said standard in the vertical pivotal movement of the sight whereby a radial line may be inscribed on said chart as the sight is moved, and an arm pivoted on said standard having a straight line to be moved over said chart whereby the drift angle of the craft may be determined.

3. In a drift sight for aircraft, the combination of a vertical standard mounted for pivotal movement on a vertical axis, a telescope sight pivoted to the upper end thereof for movement on a horizontal axis, a record chart under said sight, a scribe to be moved over said chart, and a holder for said scribe connected with said sight and said standard to be oscillated in the vertical plane of said sight, and to move laterally in the lateral movement of said sight and said standard, said connection comprising a bell crank pivoted to said standard on an axis parallel to said telescope axis having one leg carrying the scribe holder and means pivotally connecting the other leg with said sight.

4. In a drift sight for aircraft, a support, a sight, means mounting said sight on said support for pivotal movement about a vertical axis and pivotal movement about a horizontal axis, a record chart on said support, a scribe connected with said sight to move laterally with lateral movement of said sight and radially in the vertical pivotal movement of the sight whereby a radial line may be inscribed on said chart as the sight is moved and pivoted straight-edge means on said support to be moved over said chart whereby the drift angle of the craft may be determined.

In testimony whereof I affix my signature.

BRADLEY JONES.